(12) United States Patent
Luechinger et al.

(10) Patent No.: US 11,364,565 B2
(45) Date of Patent: Jun. 21, 2022

(54) ULTRASONIC WELDING SYSTEMS AND METHODS OF USING THE SAME

(71) Applicant: Kulicke and Soffa Industries,Inc., Fort Washington, PA (US)

(72) Inventors: Christoph B. Luechinger, Irvine, CA (US); Orlando L. Valentin, Aliso Viejo, CA (US)

(73) Assignee: Kulicke and Soffa Industries, Inc., Fort Washington, PA (US)

( * ) Notice: Subject to any disclaimer, the term of this patent is extended or adjusted under 35 U.S.C. 154(b) by 106 days.

(21) Appl. No.: 17/104,711

(22) Filed: Nov. 25, 2020

(65) Prior Publication Data

US 2021/0078099 A1    Mar. 18, 2021

Related U.S. Application Data

(63) Continuation of application No. 16/321,635, filed as application No. PCT/US2018/025941 on Apr. 3, 2018, now Pat. No. 10,882,134.
(Continued)

(51) Int. Cl.
*B23K 20/00* (2006.01)
*B23K 20/10* (2006.01)
(Continued)

(52) U.S. Cl.
CPC ............ *B23K 20/106* (2013.01); *B23K 20/10* (2013.01); *B23K 20/26* (2013.01); *B23K 37/047* (2013.01);
(Continued)

(58) Field of Classification Search
CPC ............ B23K 20/10–106; B23K 20/26; B23K 37/0435; B23K 37/047; B23K 2101/36; B23K 37/0235; B23K 1/06; B29C 65/08
(Continued)

(56) References Cited

U.S. PATENT DOCUMENTS 3,926,357 A * 12/1975 Matrisian ............. H01H 11/041
228/110.1
3,995,845 A * 12/1976 Scheffer ................. B23K 20/10
269/286
(Continued)

FOREIGN PATENT DOCUMENTS

EP       2769919 A1    8/2014
JP       55030810      3/1980
(Continued)

OTHER PUBLICATIONS

European Search Report dated Dec. 15, 2020, European Application No. EP18781172.
(Continued)

*Primary Examiner* — Kiley S Stoner
(74) *Attorney, Agent, or Firm* — Christopher M. Spletzer, Sr.

(57) ABSTRACT

An ultrasonic welding system is provided. The ultrasonic welding system includes a support structure for supporting a workpiece. The ultrasonic welding system also includes a weld head assembly including an ultrasonic converter carrying a sonotrode. The weld head assembly is moveable along a plurality of substantially horizontal axes. The sonotrode is configured to operate during a welding operation at a bond force of between 5-500 kg, and with a sonotrode tip motion amplitude of between 5-150 microns.

12 Claims, 5 Drawing Sheets

Related U.S. Application Data

(60) Provisional application No. 62/481,408, filed on Apr. 4, 2017.

(51) Int. Cl.
| | | |
|---|---|---|
| *B23K 20/26* | (2006.01) | |
| *B23K 37/04* | (2006.01) | |
| *B23K 37/047* | (2006.01) | |
| *B23K 101/36* | (2006.01) | |

(52) U.S. Cl.
CPC ...... *B23K 37/0435* (2013.01); *B23K 2101/36* (2018.08)

(58) Field of Classification Search
USPC .............................................. 228/110.1, 1.1
See application file for complete search history.

(56) References Cited

U.S. PATENT DOCUMENTS

| | | | | |
|---|---|---|---|---|
| 4,411,721 A | * | 10/1983 | Wishart | B29C 66/1122 |
| | | | | 156/580.2 |
| 5,427,301 A | * | 6/1995 | Pham | B23K 20/10 |
| | | | | 257/E21.511 |
| 5,614,057 A | * | 3/1997 | Conley, Jr. | B29C 66/1122 |
| | | | | 156/502 |
| 5,947,364 A | * | 9/1999 | Tamura | B23K 20/106 |
| | | | | 156/580.2 |
| 6,168,063 B1 | * | 1/2001 | Sato | B23K 20/10 |
| | | | | 228/49.1 |
| 6,193,136 B1 | * | 2/2001 | Higashi | H01L 21/67126 |
| | | | | 228/110.1 |
| 8,573,468 B1 | * | 11/2013 | Luechinger | H01L 31/18 |
| | | | | 228/180.5 |
| 10,096,570 B2 | | 10/2018 | Yoneda et al. | |
| 2002/0162875 A1 | * | 11/2002 | Miller | B23K 20/10 |
| | | | | 228/180.5 |
| 2005/0145306 A1 | | 7/2005 | Statnikov | |
| 2006/0071054 A1 | | 4/2006 | Bolser | |
| 2006/0097028 A1 | * | 5/2006 | Kainuma | B23K 20/10 |
| | | | | 228/110.1 |
| 2006/0169388 A1 | | 8/2006 | Shimizu et al. | |
| 2008/0131758 A1 | | 6/2008 | Makovetski et al. | |
| 2008/0265004 A1 | | 10/2008 | Stroh | |
| 2009/0277951 A1 | * | 11/2009 | Ebihara | H01L 24/75 |
| | | | | 228/110.1 |
| 2010/0038406 A1 | * | 2/2010 | Masuda | H01L 24/75 |
| | | | | 228/110.1 |
| 2010/0140326 A1 | * | 6/2010 | Ebihara | B23K 20/106 |
| | | | | 228/111.5 |
| 2010/0206458 A1 | * | 8/2010 | Yamada | B29C 66/43 |
| | | | | 156/538 |
| 2012/0080507 A1 | * | 4/2012 | Luechinger | B23K 20/10 |
| | | | | 228/110.1 |
| 2012/0085812 A1 | * | 4/2012 | Luechinger | H01L 31/0504 |
| | | | | 228/110.1 |
| 2012/0267035 A1 | * | 10/2012 | Maiorino | B29C 65/08 |
| | | | | 156/350 |
| 2013/0026211 A1 | * | 1/2013 | Fujita | H01L 24/75 |
| | | | | 228/110.1 |
| 2013/0049201 A1 | | 2/2013 | Yoshida et al. | |
| 2013/0112735 A1 | * | 5/2013 | Luechinger | H01L 31/0504 |
| | | | | 228/110.1 |
| 2013/0221504 A1 | | 8/2013 | Schulz | |
| 2013/0228611 A1 | * | 9/2013 | Byars | B23K 37/0408 |
| | | | | 228/1.1 |
| 2014/0110833 A1 | | 4/2014 | Yoo | |
| 2015/0090405 A1 | * | 4/2015 | Hull | B29C 66/81427 |
| | | | | 156/580.2 |
| 2015/0210003 A1 | | 7/2015 | Short et al. | |
| 2016/0133712 A1 | | 5/2016 | Yoneda et al. | |
| 2016/0151966 A1 | * | 6/2016 | Melack | B23K 20/10 |
| | | | | 156/580.2 |
| 2016/0158876 A1 | | 6/2016 | Cooper et al. | |
| 2016/0211544 A1 | * | 7/2016 | Yanagi | B29C 66/72325 |
| 2016/0300770 A1 | | 10/2016 | Taya | |
| 2017/0125835 A1 | * | 5/2017 | Seong | B23K 20/10 |
| 2017/0141011 A1 | | 5/2017 | Oohiraki | |
| 2017/0154855 A1 | | 6/2017 | Oi | |
| 2017/0170091 A1 | | 6/2017 | Kim | |
| 2017/0214064 A1 | | 7/2017 | Lex | |
| 2017/0221853 A1 | | 8/2017 | Yoneyama | |
| 2017/0338190 A1 | | 11/2017 | Fujino | |
| 2017/0374755 A1 | | 12/2017 | Chi | |
| 2018/0076167 A1 | | 3/2018 | Chuang | |
| 2018/0141163 A1 | * | 5/2018 | Wendt | B23K 26/0846 |
| 2018/0272463 A1 | * | 9/2018 | Ichinose | B23K 20/26 |
| 2019/0115704 A1 | * | 4/2019 | Copperthite | H01R 43/205 |
| 2019/0160587 A1 | * | 5/2019 | Ichinose | B23K 20/02 |
| 2020/0164460 A1 | * | 5/2020 | Copperthite | B23K 20/10 |

FOREIGN PATENT DOCUMENTS

| | | |
|---|---|---|
| JP | 02012848 | 1/1990 |
| JP | 1996-020071 | 1/1996 |
| JP | 2007-005474 | 1/2007 |
| JP | 2012-024790 | 2/2012 |
| JP | 2014-056917 | 3/2014 |
| JP | 2017-024040 | 2/2017 |
| KR | 20140013454 A * | 2/2014 |
| WO | WO2014080053 A1 | 5/2014 |
| WO | WO2016167526 A1 | 10/2016 |
| WO | WO2016-199621 | 12/2016 |

OTHER PUBLICATIONS

International Search Report dated Aug. 6, 2018, International Application No. PCT/US2018/025941.

* cited by examiner

ULTRASONIC WELDING SYSTEMS AND METHODS OF USING THE SAME

CROSS-REFERENCE TO RELATED APPLICATION

This application is a continuation of U.S. patent application Ser. No. 16/321,635 filed Jan. 29, 2019, which claims the benefit of International Application No. PCT/US2018/025941 filed Apr. 3, 2018 which claims the benefit of U.S. Provisional Application No. 62/481,408, filed Apr. 4, 2017, the content of which is incorporated herein by reference in its entirety.

FIELD

The invention relates to the ultrasonic welding, and more particularly, to improved systems and methods for performing ultrasonic welding operations.

BACKGROUND

Ultrasonic energy is widely used in forming interconnections between two or more materials. For examples, wire bonding machines (e.g., ball bonding machines, wedge bonding machines, ribbon bonding machines, etc.) are used to bond a wire or ribbon to a bonding location. However, wire bonding utilizes relatively low levels of energy (e.g., bond force, ultrasonic energy, etc.). Exemplary wire bonding machines are marketed by Kulicke and Soffa Industries, Inc. of Fort Washington, Pa.

Certain applications involve joining of materials other than wire. Welding has been considered for such applications. Ultrasonic welding is also a widely used technology. Ultrasonic welding may use an ultrasonic converter (e.g., carrying a sonotrode) for converting electrical energy into mechanical movement/scrub (e.g., linear movement/scrub, torsional movement/scrub, etc.). However, existing ultrasonic welding technology and equipment is limited in its ability to provide solutions that can satisfy market demand in terms of cost, operational efficiency, flexibility, portability, and related factors.

Thus, it would be desirable to improve ultrasonic welding technology to overcome existing barriers to potential markets.

SUMMARY

According to another exemplary embodiment of the invention, an ultrasonic welding system is provided. The ultrasonic welding system includes a support structure for supporting a workpiece. The ultrasonic welding system also includes a weld head assembly including an ultrasonic converter carrying a sonotrode. The weld head assembly is moveable along a plurality of substantially horizontal axes. The sonotrode is configured to operate during a welding operation at a bond force of between 5-500 kg, and with a sonotrode tip motion amplitude of between 5-150 microns.

According to yet another exemplary embodiment of the invention, an ultrasonic welding system is provided. The ultrasonic welding system includes a support structure for supporting a workpiece. The ultrasonic welding system also includes a weld head assembly including an ultrasonic converter carrying a sonotrode. The weld head assembly is moveable along a plurality of substantially horizontal axes. The workpiece provided to the ultrasonic welding system includes a contact element and a base structure, wherein the sonotrode is configured to ultrasonically weld at least one conductive contact of the contact element to a respective conductive region of the base structure.

According to yet another exemplary embodiment of the invention, a method of operating an ultrasonic welding system is provided. The method includes the steps of: (a) supporting a workpiece on a support structure of the ultrasonic welding system; and (b) welding a first portion of the workpiece to a second portion of the workpiece using a weld head assembly including an ultrasonic converter carrying a sonotrode, the weld head assembly being moveable along a plurality of substantially horizontal axes, the sonotrode being configured to weld the first portion of the workpiece to the second portion of the workpiece during a welding operation at a bond force of between 5-500 kg, and with a sonotrode tip motion amplitude of between 5-150 microns.

According to yet another exemplary embodiment of the invention, another method of operating an ultrasonic welding system is provided. The method includes the steps of: (a) supporting a workpiece on a support structure of the ultrasonic welding system; and (b) welding (i) a conductive contact of a contact element of the workpiece to (ii) a respective conductive region of a base structure of the workpiece, using a weld head assembly including an ultrasonic converter carrying a sonotrode, the weld head assembly being moveable along a plurality of substantially horizontal axes.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

In accordance with the invention, ultrasonic welding capability is provided in welding systems (and corresponding methods) that may achieve efficient volume production. Aspects of the invention relate to cameras (e.g., for pattern recognition), process diagnostics, material handling and fixturing/clamping systems, cleaning (debris removal) systems, (optical) inspection systems, amongst others.

Figure 1:
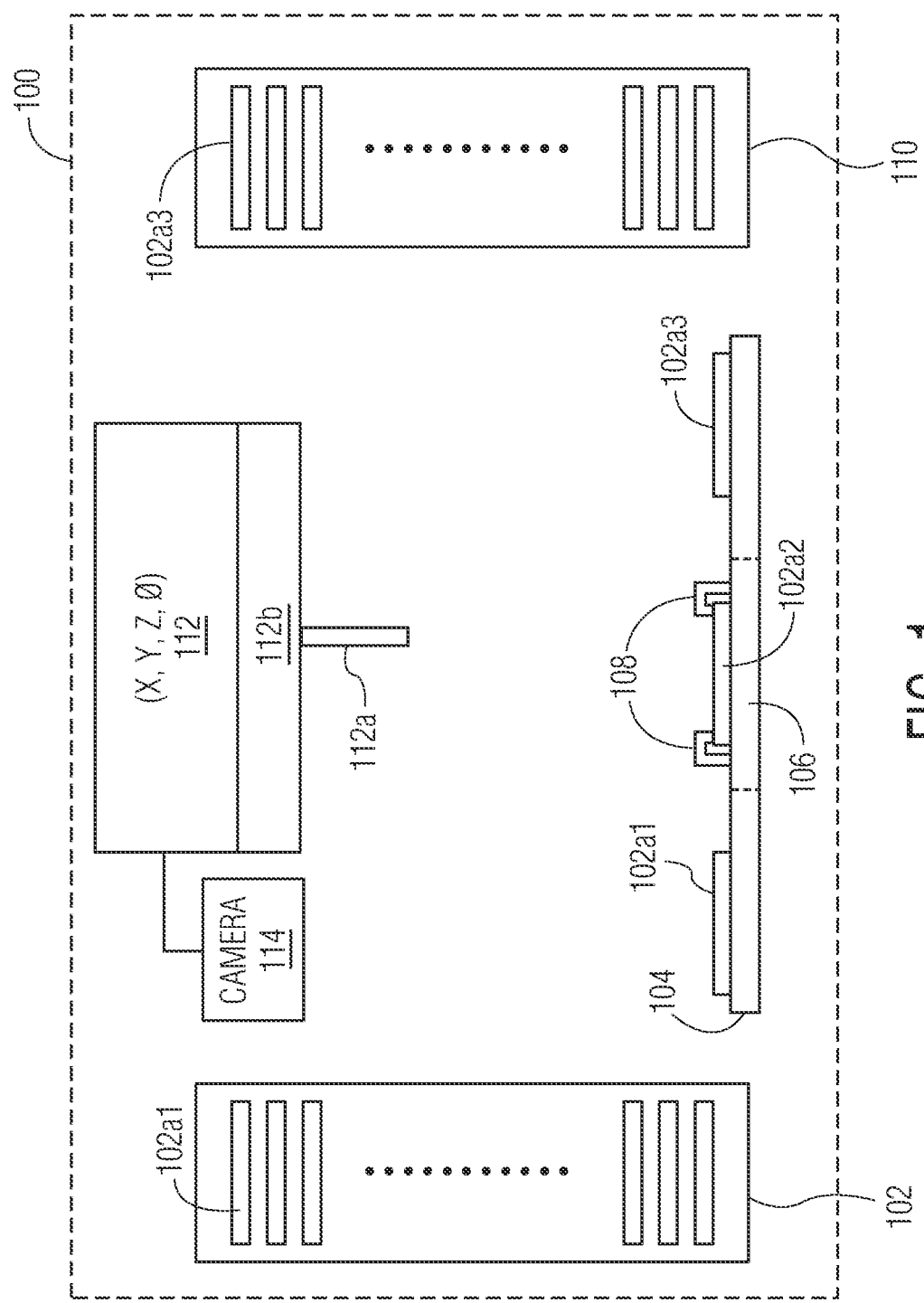
FIG. 1 is a block diagram side view of an ultrasonic welding system in accordance with an exemplary embodiment of the invention.

FIG. 1 illustrates an ultrasonic welding system 100. Ultrasonic welding system 100 includes an input workpiece supply 102 for providing a workpiece 102a1, where input workpiece supply 102 is configured to carry a plurality of workpieces 102*a*1 (e.g., supply 102 may be a carrier such as a magazine handler for carrying a plurality of workpieces 102*a*1, or other supply structure suitable for the application specific workpiece, etc.). Exemplary workpieces 102*a*1 carried by input workpiece supply 102 include power modules, components of power modules, lead frames, battery modules, etc. Workpieces 102*a*1 are provided (by any desired transport assembly which may be included in a material handling system 104, such as a gripper assembly) from input workpiece supply 102 to a material handling system 104. Material handling system 104 moves the workpiece 102*a*1 (e.g., using a conveyor assembly, using a gripper assembly, etc.) from the input workpiece supply 102 to the support structure 106. Support structure 106 supports the workpiece (now labelled as clamped workpiece 102*a*2, when clamped against support structure 106 using workpiece clamp 108) during a welding operation. After the welding operation (described below with respect to weld head assembly 112), the now welded workpiece 102*a*3 is moved (e.g., using a conveyor assembly, using a gripper assembly, etc.) from a portion of material handling 104 downstream of support structure 106, to an output workpiece supply 110. Output workpiece supply 110 is configured to receive workpieces 102*a*3 after processing by weld head assembly 112 (where weld head assembly 112 includes an ultrasonic converter 112*b* carrying a sonotrode 112*a*). Output workpiece supply 110 may be a carrier such as a magazine handler for carrying a plurality of welded workpieces 102*a*3, or other supply structure suitable for the application specific workpiece.

Ultrasonic welding system 100 includes a weld head assembly 112. Weld head assembly includes an ultrasonic converter 112*b* carrying a sonotrode 112*a*, and is moveable along a plurality of substantially horizontal axes. In the example shown in FIG. 1, weld head assembly 112 is configured to move along the x-axis and the y-axis of ultrasonic welding system 100 (see example x-axis and y-axis on FIG. 2). In the example shown in FIG. 1, weld head assembly 112 is also configured to move along the z-axis of ultrasonic welding system 100, and about a theta axis (ø-axis) of ultrasonic welding system 100. Using the motion axes of weld head assembly 112, sonotrode 112*a* is able to be moved into proper welding positions with respect to clamped workpiece 102*a*2. Camera 114 is also provided (where camera may optionally be carried by weld head assembly 112, or may be carried by another part of ultrasonic welding system 100) for imaging operations related to the alignment between sonotrode 112*a* and clamped workpiece 102*a*2, the alignment of the components of clamped workpiece 102*a*2 in itself, optical inspection of the welds after welding operation, etc.

According to certain exemplary embodiments of the invention, during the welding operations, exemplary technical specifications include: (i) the sonotrode being configured to operate at a bond force of between 5-500 kg, or the sonotrode being configured to operate at a bond force of between 5-300 kg, or the sonotrode being configured to operate at a bond force of between 5-100 kg; (ii) the sonotrode tip motion amplitude being between 5-150 microns, or the sonotrode tip motion amplitude being between 5-120 microns, or the sonotrode tip motion amplitude being between 5-100 microns; (iii) the sonotrode being configured to form an ultrasonic weld between a first portion of a workpiece and a second portion of a workpiece having an area in a range between 1.5-30 $mm^2$; or the sonotrode being configured to form an ultrasonic weld between a first portion of a workpiece and a second portion of a workpiece having an area in a range between 1.5-20 $mm^2$; or the sonotrode being configured to form an ultrasonic weld between a first portion of a workpiece and a second portion of a workpiece having an area in a range between 1.5-16 $mm^2$; and (iv) the sonotrode being configured to operate at a frequency in a range between 15-40 kHz, or the sonotrode being configured to operate at a frequency in a range between 20-35 kHz, or the sonotrode being configured to operate at a frequency in a range between 20-30 kHz. Exemplary thicknesses of the conductive contact of the contact element (the part of the workpiece being contacted by the sonotrode) include: between 0.2-3 mm; 0.2-1.5 mm, and 0.2-1.2 mm.

Figure 2:
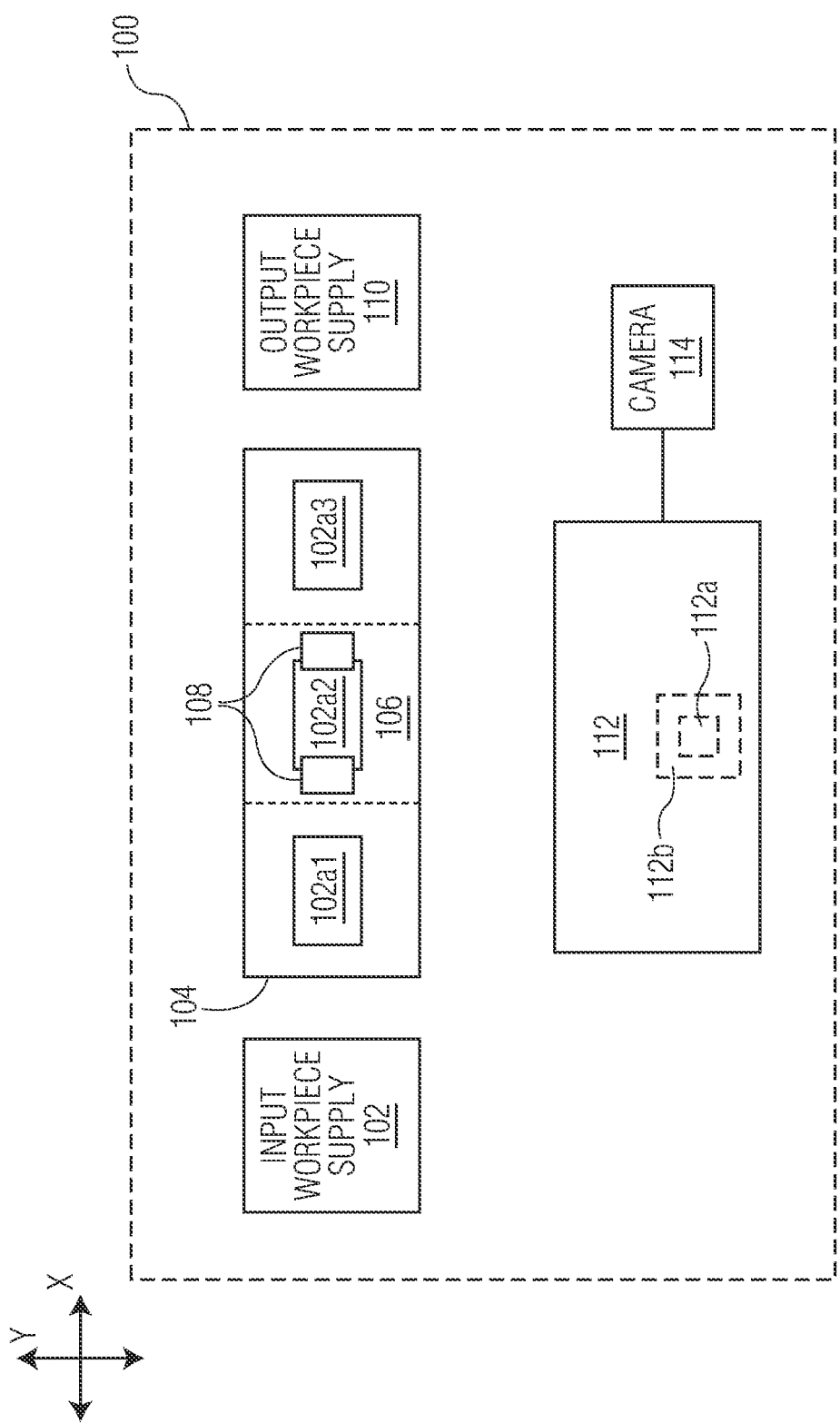
FIG. 2 is a block diagram top view of the ultrasonic welding system of FIG. 1.

FIG. 2 is an overhead view of the elements of ultrasonic welding system 100 shown in FIG. 1.

Figure 3A:
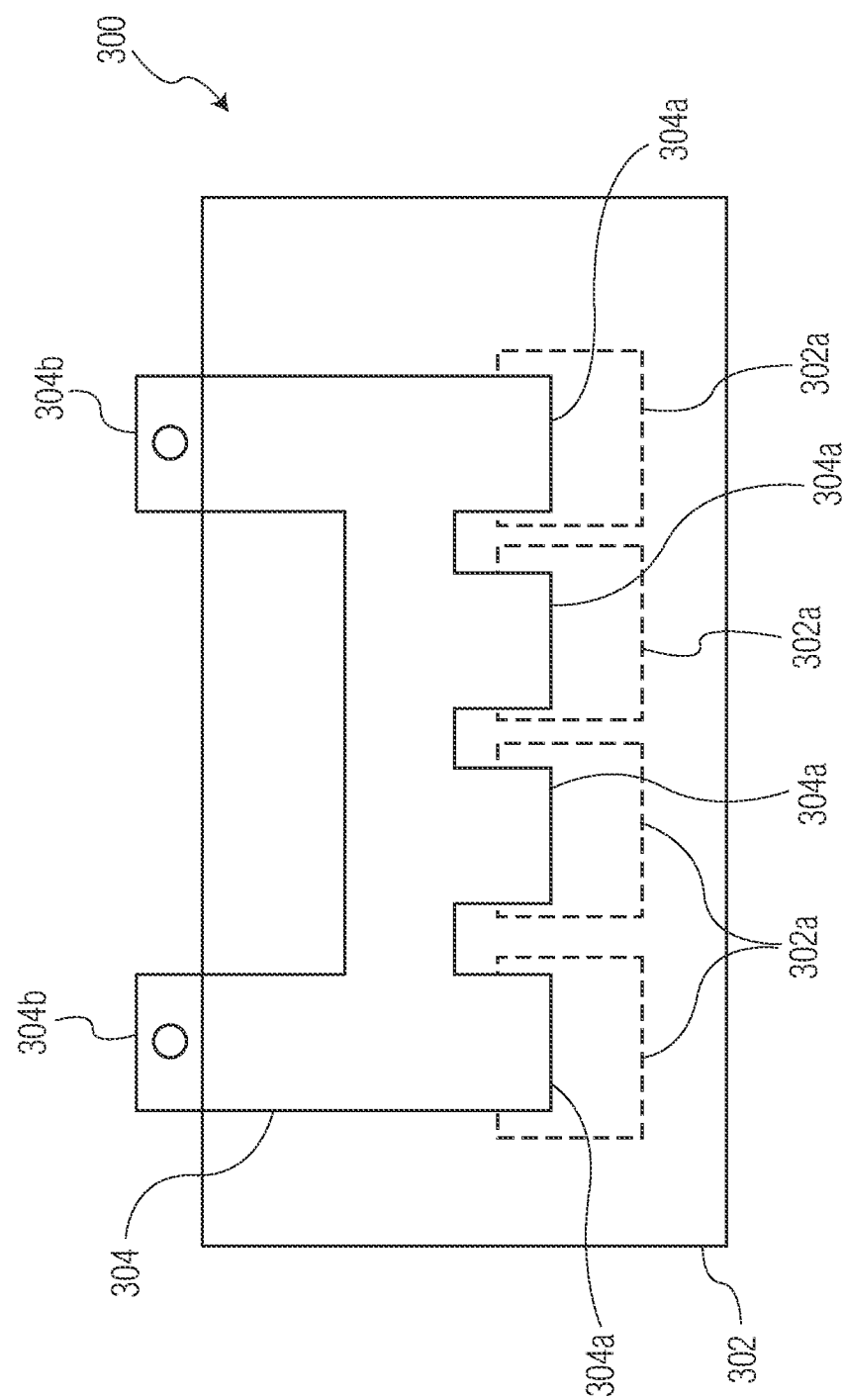
FIG. 3A is a block diagram top view of a workpiece configured for welding using ultrasonic welding systems in accordance with various exemplary embodiments of the invention.
Figure 3B:
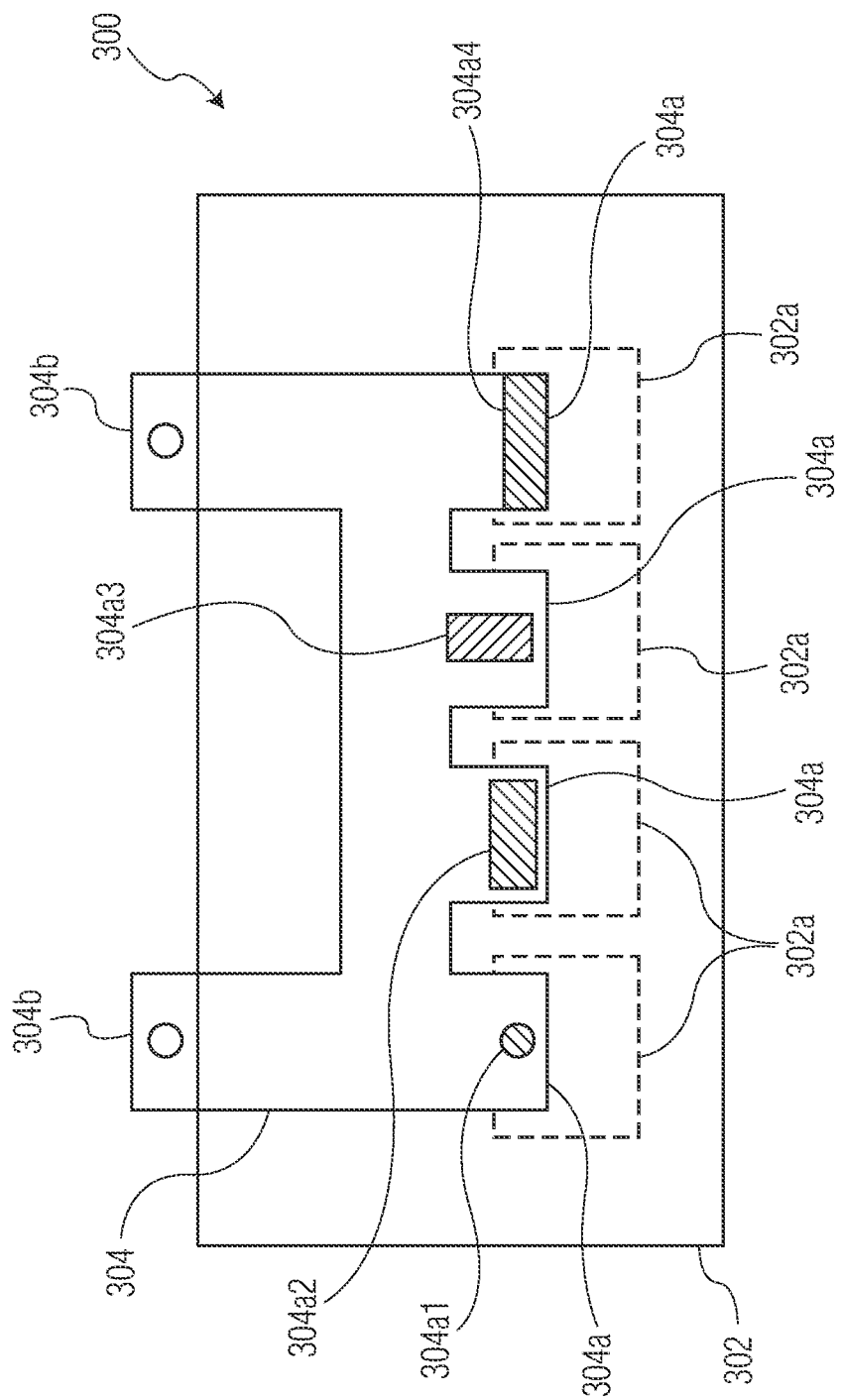
FIG. 3B is a block diagram top view of the workpiece of FIG. 3A including exemplary welded connections in accordance with various exemplary embodiments of the invention.

Various types of workpieces may be welded using ultrasonic welding system 100 (or other systems with the scope of the invention). Such workpieces may include a first portion of the workpiece configured to be welded to a second portion of the workpiece. FIGS. 3A-3B illustrate an example of such workpieces—where workpiece 300 of FIG. 3A is an example of workpiece 102*a*1 in FIG. 1. In the example of FIG. 3A, the first portion of the workpiece 300 is a contact element 304 including a plurality of conductive contacts 304*a* (and contact element 304 also includes external contacts 304*b* configured for connection to an external circuit), and the second portion of the workpiece is a base structure 302 including a plurality of conductive regions 302*a*. In the example of FIG. 3A, contact element 304 is already provided on base structure 302. Specifically, conductive contacts 304*a* are aligned with conductive regions 302*a*, and are ready for welding.

After positioning workpiece 300 on a support structure (e.g., support structure 106 of ultrasonic welding system 100 in FIG. 1), a sonotrode is used to form ultrasonic welds. FIG. 3B illustrates workpiece 300 from FIG. 3A, but with 4 examples of different ultrasonic welds having been formed. A first ultrasonic weld 304*a*1 is formed between a conductive contact 304*a* and a respective conductive region 302*a*, where ultrasonic weld 304*a*1 is formed using ultrasonic torsional motion (thereby forming a substantially round ultrasonic weld 304*a*1). Of course, other types of ultrasonic motion (other than torsional motion) are contemplated. For example, FIG. 3B illustrates a second ultrasonic weld 304*a*2 (formed using linear ultrasonic motion, for example, along an x-axis), and a third ultrasonic weld 304*a*3 (formed using linear ultrasonic motion, for example, along a y-axis that is substantially perpendicular to the x-axis). Ultrasonic welds 304*a*2 and 304*a*3 can also be formed by torsional ultrasonic motion (e.g., torsional ultrasonic motion may, of course, be used to form non-round ultrasonic welds). The fourth ultrasonic weld 304*a*4, formed using linear or torsional motion, covers the conductive contact area to three of its edges. Besides linear and torsional ultrasonic motion, combinations of both can be used.

Figure 4:
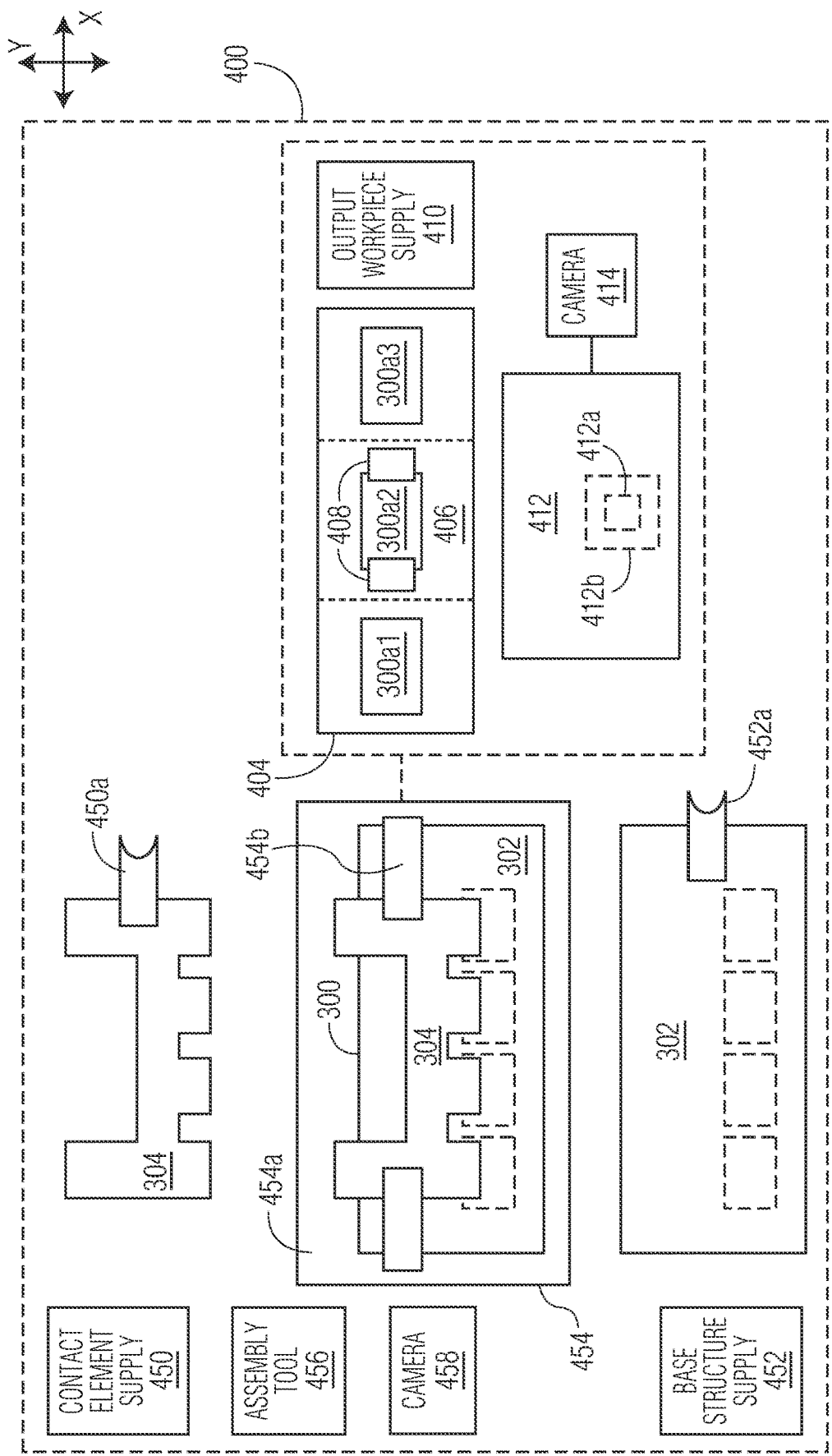
FIG. 4 is a block diagram top view of another ultrasonic welding system in accordance with another exemplary embodiment of the invention.

Referring again back to FIG. 1, input workpiece supply 102 includes workpieces 102*a*1 including each of a first portion and a second portion, already assembled together, and ready for welding. For example, workpieces 102*a*1 may be workpiece 300 from FIG. 3A including a first portion (contact element 304) assembled together with a second portion (base structure 302), and ready for welding. However, according to certain embodiments of the invention, the first portion of a workpiece (e.g., a contact element) may not be assembled together with the second portion (e.g., a base structure) at the start of processing by the ultrasonic welding system. FIG. 4 illustrates such a system.

Referring now to FIG. 4, ultrasonic welding system 400 includes a contact element supply 450 (e.g., a magazine or other supply including a plurality of contact elements 304) and a base structure supply 452 (e.g., a magazine or other supply including a plurality of base structures 302). Ultrasonic welding system 400 also includes a workpiece assembly station 454 for assembling contact elements 304 with respective base structures 452. More specifically, a base structure removal tool 452a removes a base structure 302 from base structure supply 452, and moves the base structure 302 to support structure 454a of workpiece assembly station 454. For example, base structure removal tool 452a may be a gripper type tool configured to move along the x-axis, the y-axis, and a z-axis. Likewise, a contact element removal tool 450a removes a contact element 304 from contact element supply 450, and moves the contact element 304 to support structure 454a (on top of base structure 302). For example, contact element removal tool 450a may be a gripper type tool configured to move along the x-axis, the y-axis, and a z-axis. Once aligned/assembled, assembly clamp 454b is used to keep contact element 300 positioned relative to base structure 302. Camera 458 may be used to help with and ensure proper alignment of contact element 304 to base structure 302. Assembly tool 456 may provide further assembly functions (e.g., pressing, adhesive distribution, etc.).

After processing (and assembly) at workpiece assembly station 454, the assembled workpiece 300 (now labelled as workpiece 300a1 in FIG. 4) is provided to material handling system 404 (substantially similar to material handling system 104 of FIG. 1). The workpiece 300 is then moved to support structure 406 (substantially similar to support structure 106 of FIG. 1). Workpiece clamp 408 (substantially similar to workpiece clamp 108 of FIG. 1) secures clamped workpiece 300a2 against support structure 406. Sonotrode 412a (substantially similar to sonotrode 112a of FIG. 1) is carried by ultrasonic converter 412b (where converter 412b is included in weld head assembly 412), and ultrasonically welds conductive contacts (of contact element 300 of workpiece 300a2) to conductive regions (of base structure 302 of workpiece 300a2), using camera 414 (substantially similar to camera 114 of FIG. 1) for alignment. After welding, the now welded workpiece 300a3 is moved to output workpiece supply 410 (substantially similar to output workpiece supply 110 of FIG. 1).

The operation of weld head assembly 412 of ultrasonic welding system 400 may be substantially similar to that described above with respect to weld head assembly 112 of ultrasonic welding system 100 of FIGS. 1-2. Further, the exemplary technical specifications described herein (e.g., the exemplary ranges for each of operational bond force of the sonotrode, sonotrode tip motion amplitude, ultrasonic weld area, and operational frequency of the sonotrode, conductive contact thicknesses, etc.) are equally applicable to the ultrasonic welding systems of FIGS. 1-2 and FIG. 4, as well as any other ultrasonic welding system within the scope of the invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An ultrasonic welding system comprising:
    a contact element supply for providing a plurality of contact elements;
    a base structure supply for providing a plurality of base structures;
    a workpiece assembly station for assembling a workpiece, the workpiece including one of the contact elements and a respective base structure, wherein the workpiece assembly station is configured to align the one of the contact elements of the workpiece to the respective base structure of the workpiece, wherein the workpiece is selected from the group consisting of a power module, a lead frame and a battery module;
    a camera used to ensure proper alignment of the one of the contact elements of the workpiece to the respective base structure of the workpiece;
    a support structure for supporting the workpiece after assembly of the workpiece at the workpiece assembly station, and before ultrasonic welding of the workpiece by a sonotrode;
    a material handling system for moving the workpiece from the workpiece assembly station to the support structure;
    a workpiece clamping system for clamping the workpiece to the support structure during ultrasonic welding by the sonotrode;
    a weld head assembly including an ultrasonic converter carrying the sonotrode, the weld head assembly being moveable along a plurality of substantially horizontal axes, the sonotrode being configured to operate during a welding operation at a bond force of between 5-500 kg, and with a sonotrode tip motion amplitude of between 5-150 microns; and
    an output workpiece supply for receiving the workpiece after processing by the sonotrode.

2. The ultrasonic welding system of claim 1 wherein the sonotrode is configured to weld a portion of the contact element to a portion of the base structure using at least one of linear ultrasonic motion and torsional ultrasonic motion.

3. The ultrasonic welding system of claim 1 wherein the sonotrode is configured to ultrasonically weld at least one conductive contact of the contact element to a respective conductive region of the base structure.

4. The ultrasonic welding system of claim 1 further comprising another camera for imaging operations related to at least one of (i) alignment between the sonotrode and a clamped workpiece, (ii) alignment of components of the clamped workpiece, and (iii) optical inspection of welds after the welding operation.

5. The ultrasonic welding system of claim 4 where the another camera is carried by the weld head assembly.

6. The ultrasonic welding system of claim 1 wherein the sonotrode is configured to form an ultrasonic weld between the one of the contact elements and the respective base structure having an area in a range between 1.5-30 mm$^2$.

7. A method of operating an ultrasonic welding system, the method comprising the steps of:
    providing a contact element including a conductive contact from a contact element supply of the ultrasonic welding system;
    providing a base structure including a conductive region from a base structure supply of the ultrasonic welding system;
    assembling a workpiece at a workpiece assembly station of the ultrasonic welding system, the workpiece including the contact element and the base structure, the workpiece being selected from the group consisting of a power module, a leadframe, and a battery module;

moving the workpiece to a support structure of the ultrasonic welding system using a material handling system;

supporting the workpiece on the support structure of the ultrasonic welding system;

clamping the workpiece to the support structure using a workpiece clamping system; and welding (i) the conductive contact of the contact element of the workpiece to (ii) the conductive region of the base structure of the workpiece, using a weld head assembly including an ultrasonic converter carrying a sonotrode, the weld head assembly being moveable along a plurality of substantially horizontal axes.

8. The method of claim 7 wherein the welding step includes welding a portion of the contact element to a portion of the base structure using at least one of linear ultrasonic motion and torsional ultrasonic motion of the sonotrode.

9. The method of claim 7 further comprising the steps of aligning the contact element and the respective base structure using a camera.

10. The method of claim 7 further comprising the step of using a camera for imaging operations in connection with at least one of (i) alignment between the sonotrode and a clamped workpiece, (ii) alignment of components of the clamped workpiece, and (iii) optical inspection of welds after the welding operation.

11. The method of claim 10, wherein the camera is carried by the weld head assembly.

12. The method of claim 7 wherein the sonotrode is configured to operate during a welding operation at a bond force of between 5-500 kg, and with a sonotrode tip motion amplitude of between 5-150 microns, and wherein the sonotrode is configured to form an ultrasonic weld between (i) the conductive contact of the contact element and (ii) the respective conductive region of a base structure, the ultrasonic weld having an area in a range between 1.5-30 $mm^2$.

* * * * *